(12) United States Patent
White et al.

(10) Patent No.: US 7,728,999 B2
(45) Date of Patent: Jun. 1, 2010

(54) PRINTING DEVICE DRIVER

(75) Inventors: Scott A. White, Boise, ID (US); Charles J. Gazdik, Boise, ID (US); Kristofer Erik Metz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 991 days.

(21) Appl. No.: 11/486,543

(22) Filed: Jul. 14, 2006

(65) Prior Publication Data

US 2008/0018924 A1 Jan. 24, 2008

(51) Int. Cl.
*G06F 15/00* (2006.01)
*G06K 1/00* (2006.01)
(52) U.S. Cl. .................. 358/1.15; 358/1.12; 358/1.9
(58) Field of Classification Search ............. 358/1.15, 358/1.2, 1.9
See application file for complete search history.

(56) References Cited

U.S. PATENT DOCUMENTS

| 6,426,798 | B1 | 7/2002 | Yeung |
| 6,449,052 | B1 | 9/2002 | Sherer et al. |
| 6,674,535 | B1 | 1/2004 | Kim |
| 6,757,070 | B1 | 6/2004 | Lin et al. |
| 6,825,941 | B1 | 11/2004 | Nguyen et al. |
| 6,943,905 | B2 | 9/2005 | Ferlitsch |
| 6,952,831 | B1 | 10/2005 | Moore |
| 6,967,728 | B1 | 11/2005 | Vidyanand |
| 7,149,826 | B2 * | 12/2006 | Howard ................ 710/62 |
| 7,312,887 | B2 * | 12/2007 | Wu ..................... 358/1.15 |
| 2005/0259277 | A1 * | 11/2005 | Ferlitsch ............... 358/1.9 |
| 2007/0024874 | A1 * | 2/2007 | Kawamura ............ 358/1.2 |
| 2007/0279675 | A1 * | 12/2007 | Quach et al. .......... 358/1.15 |

* cited by examiner

*Primary Examiner*—Chan S Park
*Assistant Examiner*—Satwant K Singh

(57) ABSTRACT

A driver for a printing device includes a communication protocol configured to retrieve capabilities of the printing device, invocation commands for invoking the capabilities of the printing device, and display strings for guiding display of the capabilities of the printing device for the printing device when the driver is initialized for use; a user interface configured to display the capabilities of the printing device for a user based on the display strings for the capabilities of the printing device as retrieved by the communication protocol; and a command emission protocol configured to render a print job of the user for the printing device based on the invocation commands for the capabilities of the printing device as retrieved by the communication protocol.

34 Claims, 6 Drawing Sheets

PRINTING DEVICE DRIVER

BACKGROUND

When using a printer from a computer, a user typically must install and use a device driver designed and developed specifically for the printer model in use. While this, in and of itself, may not be a issue when using a single printer, it does present challenges to large enterprises and organizations where there are several printers and/or many different types and models of printers. The challenges presented include getting model-specific device drivers to end users' computers and, perhaps more importantly, the costs and effort associated with testing, qualifying, and maintaining current versions of device drivers for all supported printer models.

Providing a single or small set of device drivers that can support a multitude of different devices in an organization is a very attractive option from a 'driver management' perspective, but the tradeoff has been the inability to support model-specific functionality from that single or small set of device drivers. Many printer models contain advanced paper handling (e.g., stapling, folding, duplexing) and other print-job related functionality (e.g., device specific color processing, collated copies), and to date there has not been a viable option for providing access to those advanced features from a single device driver. In other words, the tradeoff for having a single device driver comes in the form of significantly reduced access to the features and functionality supported on the various printer models. Accordingly, it is desirable to provide a single device driver that overcomes these challenges.

SUMMARY

One aspect of the present invention provides a driver for a printing device. The driver includes a communication protocol configured to retrieve capabilities of the printing device, invocation commands for invoking the capabilities of the printing device, and display strings for guiding display of the capabilities of the printing device for the printing device when the driver is initialized for use; a user interface configured to display the capabilities of the printing device for a user based on the display strings for the capabilities of the printing device as retrieved by the communication protocol; and a command emission protocol configured to render a print job of the user for the printing device based on the invocation commands for the capabilities of the printing device as retrieved by the communication protocol.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
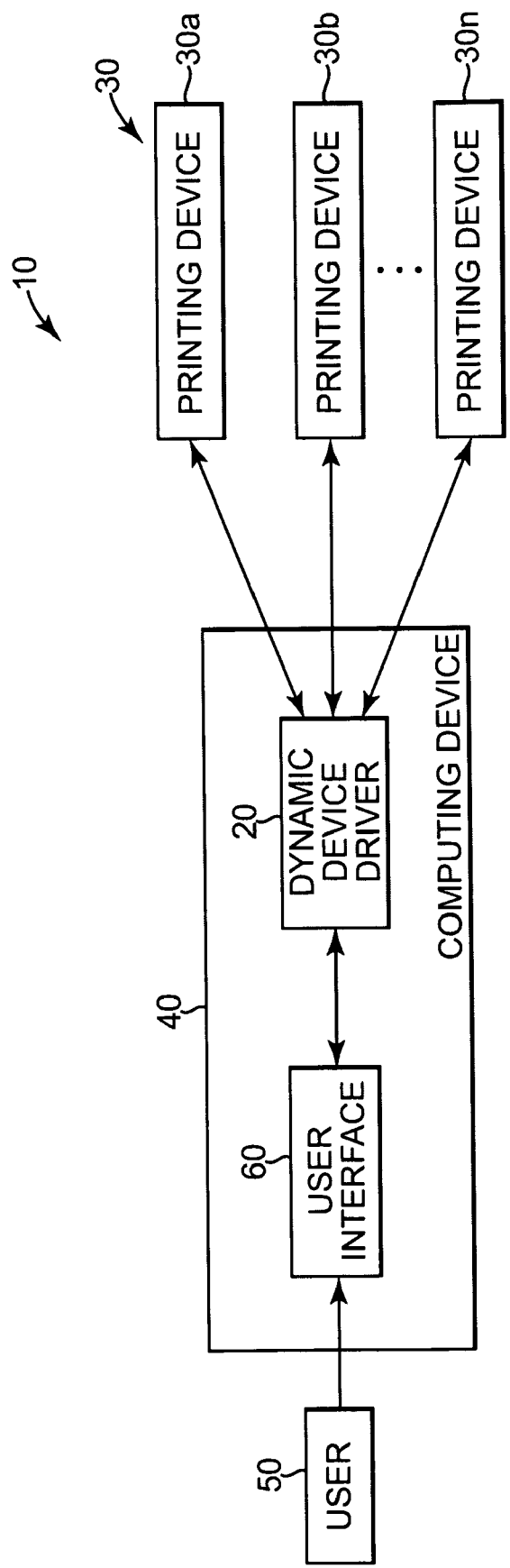
FIG. 1 is a block diagram illustrating one embodiment of a printing device driver system according to the present invention.

FIG. 1 illustrates one embodiment of a printing device driver system 10. In one embodiment, printing device driver system 10 provides a single or common dynamic device driver 20 that can be used to support multiple printing devices having similar and/or different capabilities, and expose the available capabilities of the printing devices to end users. In one embodiment, dynamic device driver 20 has the ability to discover and connect to one or more printing devices 30 when a user interface of the driver is opened or when a print job is invoked. As such, dynamic device driver 20 works with one or more printing devices 30 to determine a model and/or supported features of printing devices 30, and then automatically configures itself for the specific capabilities of each printing device. Accordingly, printing device driver system 10 provides a single device driver that can provide access to device-specific functionality.

In one embodiment, as illustrated in FIG. 1, dynamic device driver 20 communicates with one or more printing devices 30. Printing device 30 is defined to include any device or system capable of producing or generating printed output such as, for example, an ink jet printer, laser printer, thermal transfer printer, or multi-functional device providing printing, copying, and/or scanning capabilities.

In one embodiment, as illustrated in FIG. 1, dynamic device driver 20 communicates with multiple printing devices 30a, 30b, and 30n. Although illustrated as communicating with multiple printing devices, it is understood that dynamic device driver 20 may communicate with any number of printing devices including one or more printing devices.

In one embodiment, as illustrated in FIG. 1, dynamic device driver 20 is resident on a computing device 40. Computing device 40 may include, for example, an input device such as a keyboard and/or a mouse and a display device such as a monitor, as is well known in the art. In addition, computing device 40 may be an appliance such as a personal digital assistant (PDA), scanner, camera, cellular phone, etc.

Computing device 40 includes a processor and memory with the processor including logic circuitry which responds to and processes instructions for controlling computing device 40. The processor can be included in a computer server or other microprocessor-based system capable of performing a sequence of logic operations. In addition, the processor can be or can be included in a microprocessor-embedded system/appliance incorporating tailored appliance hardware and/or dedicated single purpose hardware. Examples of the memory of computing device 40 include non-volatile memory (e.g., a hard disk drive or other persistent storage device) and may include volatile memory (e.g., random access memory (RAM)).

In one exemplary embodiment, computing device 40 runs an operating system which can support one or more applications, as described below. The operating system is stored in the memory of computing device 40 and executes on the processor of computing device 40. The operating system is preferably a multi-tasking operating system which allows simultaneous execution of multiple applications, although aspects of the present invention may be implemented using a single-tasking operating system.

In one embodiment, as illustrated in FIG. 1, a user 50 interacts with computing device 40 via a user interface 60. In one embodiment, user interface 60 is displayed, for example, on a display of computing device 40 and includes various menus, fields, options, and/or selections for interacting with computing device 40.

Figure 2:
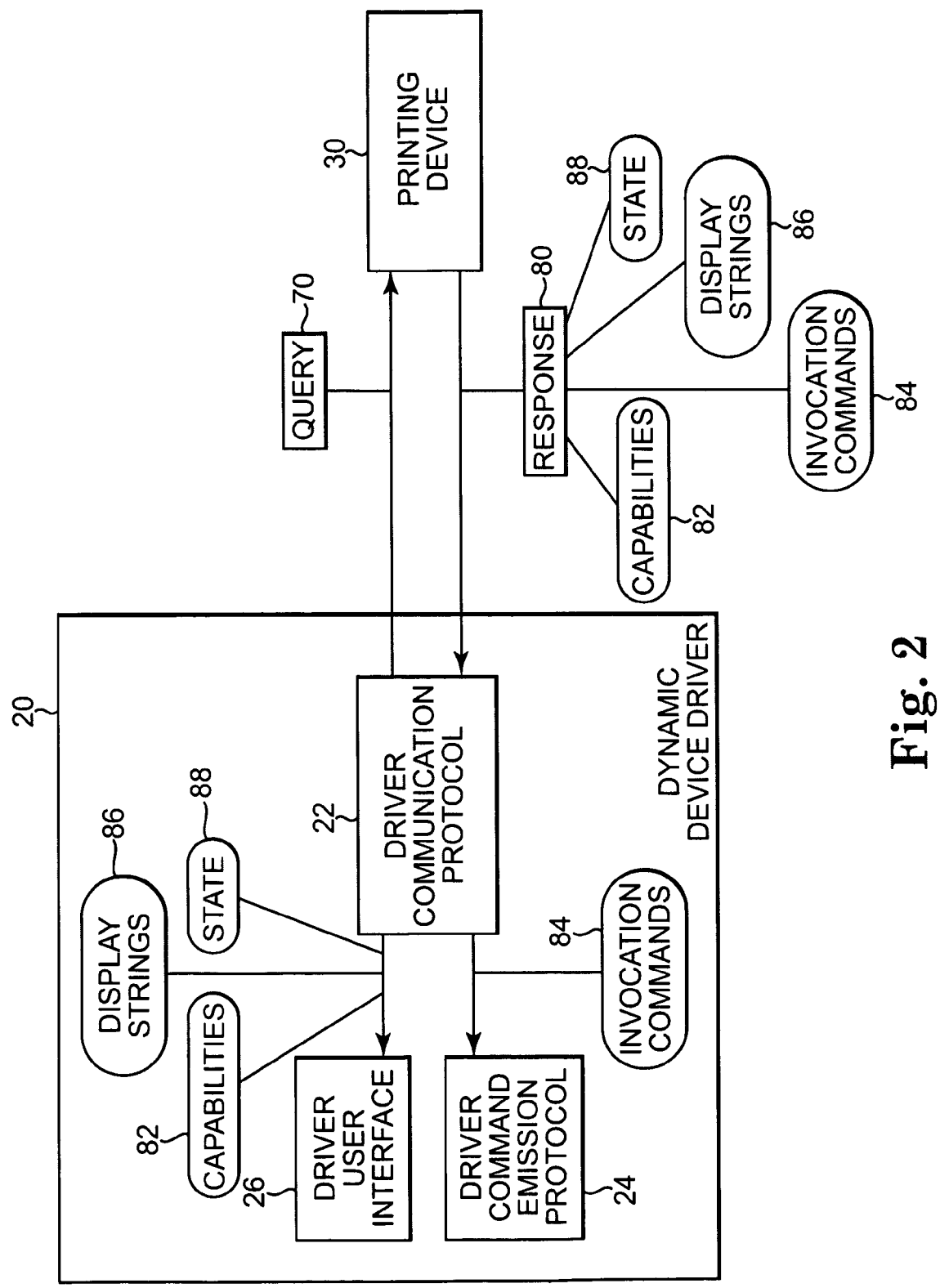
FIG. 2 is a block diagram illustrating one embodiment of a dynamic device driver of the printing device driver system of FIG. 1.

In one embodiment, as illustrated in FIG. 2, dynamic device driver 20 includes a driver communication protocol 22, a driver command emission protocol 24, and a driver user interface 26. Driver communication protocol 22 facilitates communication with printing device 30 and, in one embodiment, as described below, provides for two-way communication with printing device 30 to query printing device 30 and receive a response or responses from printing device 30. In one embodiment, as described below, driver command emission protocol 24 generates print instructions for submitting a print job to printing device 30, and driver user interface 26 is dynamically formatted or generated to display user-accessible features and/or options of printing device 30.

In one embodiment, dynamic device driver 20 communicates directly with printing device 30 to obtain device information for utilizing printing device 30. In one embodiment, for example, driver communication protocol 22 of dynamic device driver 20 submits a query 70 to printing device 30 for device information relevant in utilizing printing device 30. As such, in reply to query 70, printing device 30 returns a response 80 to dynamic device driver 20 and, more specifically, driver communication protocol 22. In one embodiment, as described below, communication between dynamic device driver 20 and printing device 30 can be with any printing device 30 that is selected or discovered when dynamic device driver 20 is initialized or selected for use including, for example, when driver user interface 26 is opened or when a print job is invoked with a printing application.

In one embodiment, dynamic device driver 20 and printing device 30 communicate via a communication protocol such as a Simple Network Management Protocol (SNMP). It is understood, however, that other protocols or manners of communication between dynamic device driver 20 and printing device 30 may be used.

With response 80, printing device 30 returns device information relevant in utilizing printing device 30. In one embodiment, for example, response 80 includes information on capabilities 82 of printing device 30, invocation commands 84 for printing device 30, display strings 86 for printing device 30, and/or a state 88 of printing device 30. In one embodiment, capabilities 82, invocation commands 84, and/or display strings 86 for printing device 30 are identified from a model and/or serial number of printing device 30 as communicated with dynamic device driver 20.

Capabilities 82 of printing device 30 include, for example, supported and/or provided features, options, and/or characteristics of printing device 30. In one embodiment, capabilities 82 include user-accessible features, options, and/or characteristics of printing device 30.

In one embodiment, capabilities 82 include media capabilities of printing device 30, media handling capabilities of printing device 30, and/or functionality capabilities of printing device 30. Media capabilities include, for example, media sizes, media types, and media orientation supported and/or provided by printing device 30. Media handling capabilities include, for example, duplexing, stapling, folding, and/or collating abilities provided by printing device 30. Functionality capabilities include, for example, print quality options, color printing options, and/or printing speed options supported and/or provided by printing device 30. It is understood, however, that additional capabilities, including supported features, options, and/or characteristics of printing device 30 may be included with capabilities 82.

Invocation commands 84 for printing device 30 include, for example, commands or instructions for invoking capabilities such as features, options, and/or characteristics of printing device 30. In one embodiment, invocation commands 84 are executable only by printing device 30 and include specific instructions for printing with printing device 30. Accordingly, as described below, invocation commands 84 are utilized by dynamic device driver 20 in generating print instructions for printing device 30.

Display strings 86 for printing device 30 include, for example, information for dynamically formatting or generating driver user interface 26. More specifically, display strings 86 are used by dynamic device driver 20 in guiding and/or configuring driver user interface 26 for display of capabilities 82 of printing device 30, as described below.

State 88 of printing device 30, includes, for example, a status of printing device 30. In one embodiment, state 88 includes an availability of printing device 30, a print queue of printing device 30, a consumables status (e.g., low media quantity, low ink quantity) of printing device 30, and/or an error state of printing device 30. In one embodiment, state 88 reports a real-time status of a print job and of printing device 30 during a printing process.

In one embodiment, capabilities 82, invocation commands 84, and/or display strings 86 are provided independent of a supported printer or page description language (PDL). For example, a printing device supporting multiple PDLs can provide constructs for describing capabilities 82, invocation commands 84, and/or display strings 86 in each of the supported languages. As such, dynamic device driver 20 can support multiple types of printing devices regardless of the PDL. Exemplary PDLs include PJL, PCL5, PCL6, PS, and PDF.

In one embodiment, as illustrated in FIG. 2, driver communication protocol 22 of dynamic device driver 20 submits query 70 to printing device 30 and printing device 30 returns response 80 including capabilities 82, invocation commands 84, display strings 86, and state 88 to driver communication protocol 22. As such, driver communication protocol 22 communicates capabilities 82, display strings 86, and state 88 of printing device 30 with driver user interface 26, and communicates invocation commands 84 for printing device 30 with driver command emission protocol 24.

In one embodiment, based on capabilities 82, display strings 86, and state 88, dynamic device driver 20 dynamically formats or generates driver user interface 26 to display supported features, options, and/or characteristics of printing device 30 for a user of printing device 30. As such, dynamic device driver 20 dynamically enables and/or disables user-accessible features and/or options based on printing device 30.

In one embodiment, driver user interface 26 is configured to display only those capabilities supported by printing device 30. As such, capabilities that are not supported by printing device 30 are not presented to the user. Accordingly, driver user interface 26 is formatted or generated specifically for printing device 30. In addition, in one embodiment, driver user interface 26 is updated based on state 88 of printing device 30 so as to represent a current status of printing device 30.

In one embodiment, based on invocation commands 84 for capabilities of printing device 30, driver command emission protocol 24 of dynamic device driver 20 generates print instructions for printing device 30, as described below.

Figure 3:
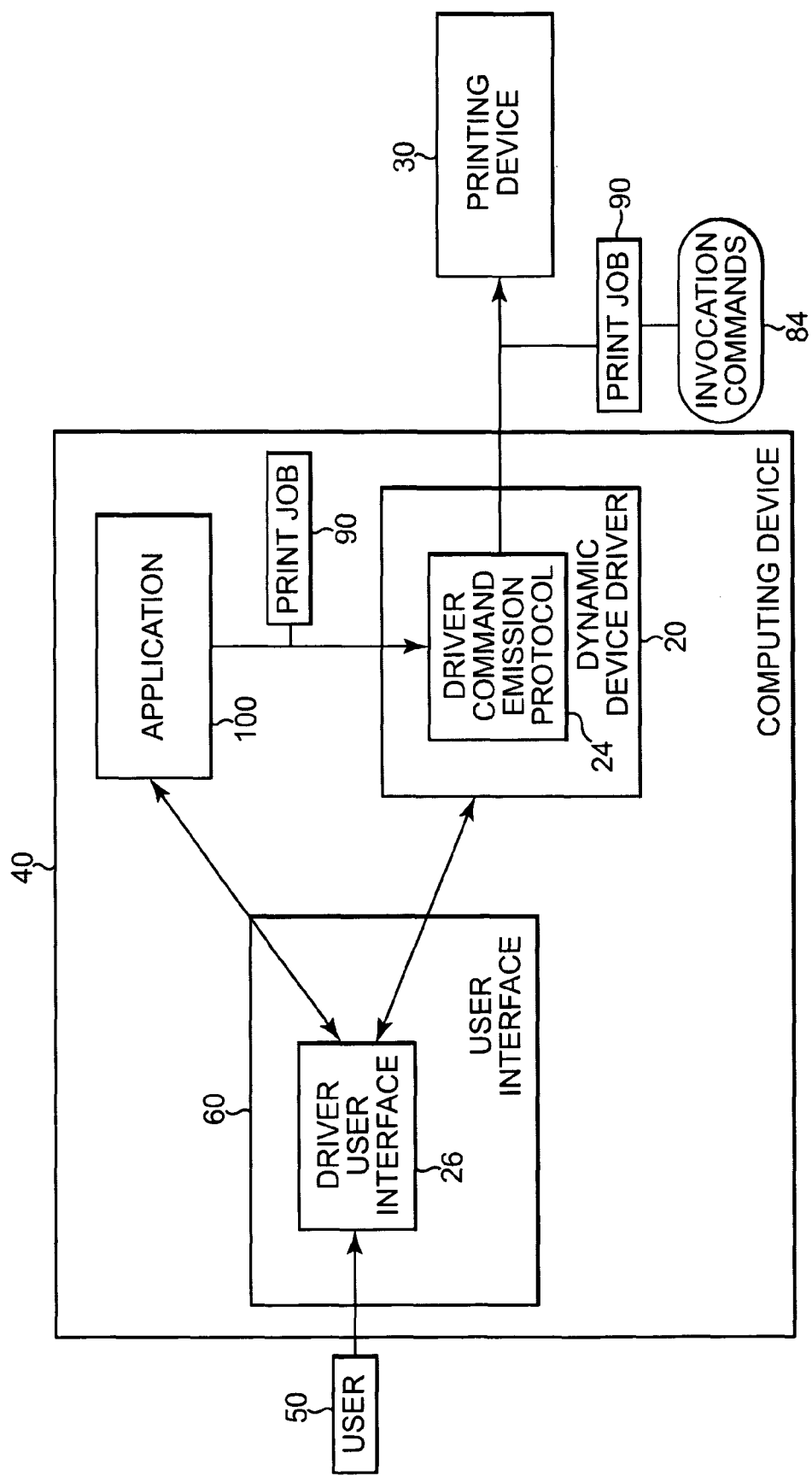
FIG. 3 is a block diagram illustrating one embodiment of submitting a print job to a printing device according to the present invention.

In one embodiment, as illustrated in FIG. 3, user 50 generates a print job 90 for printing device 30 with an application 100. Application 100 is supported by computing device 40 and includes, for example, any word processing, image processing, and/or data processing program capable of producing printed output. In one embodiment, user 50 interacts with application 100 via user interface 60.

In one embodiment, driver user interface 26 is displayed on user interface 60 of computing device 40 for user 50. Accordingly, as described above, driver user interface 26 displays capabilities of printing device 30 including, for example, features, options, and/or characteristics of printing device 30. As such, user 50 interacts with driver user interface 26 to define print job 90 by specifying and/or selecting features, options, and/or characteristics of printing device 30.

In one embodiment, print job 90 is communicated with dynamic device driver 20 and, more specifically, driver command emission protocol 24 of dynamic device driver 20. As such, dynamic device driver 20 renders print job 90 for printing by printing device 30 and includes invocation commands 84 for invoking the capabilities of printing device 30 in an output data stream for print job 90. More specifically, driver command emission protocol 24 inserts or swaps invocation commands 84 into the output data stream for invoking the features, options, and/or characteristics of printing device 30 as selected and/or specified for print job 90. Accordingly, print job 90 and invocation commands 84 are communicated with printing device 30 for generating printed output on printing device 30.

Figure 4:
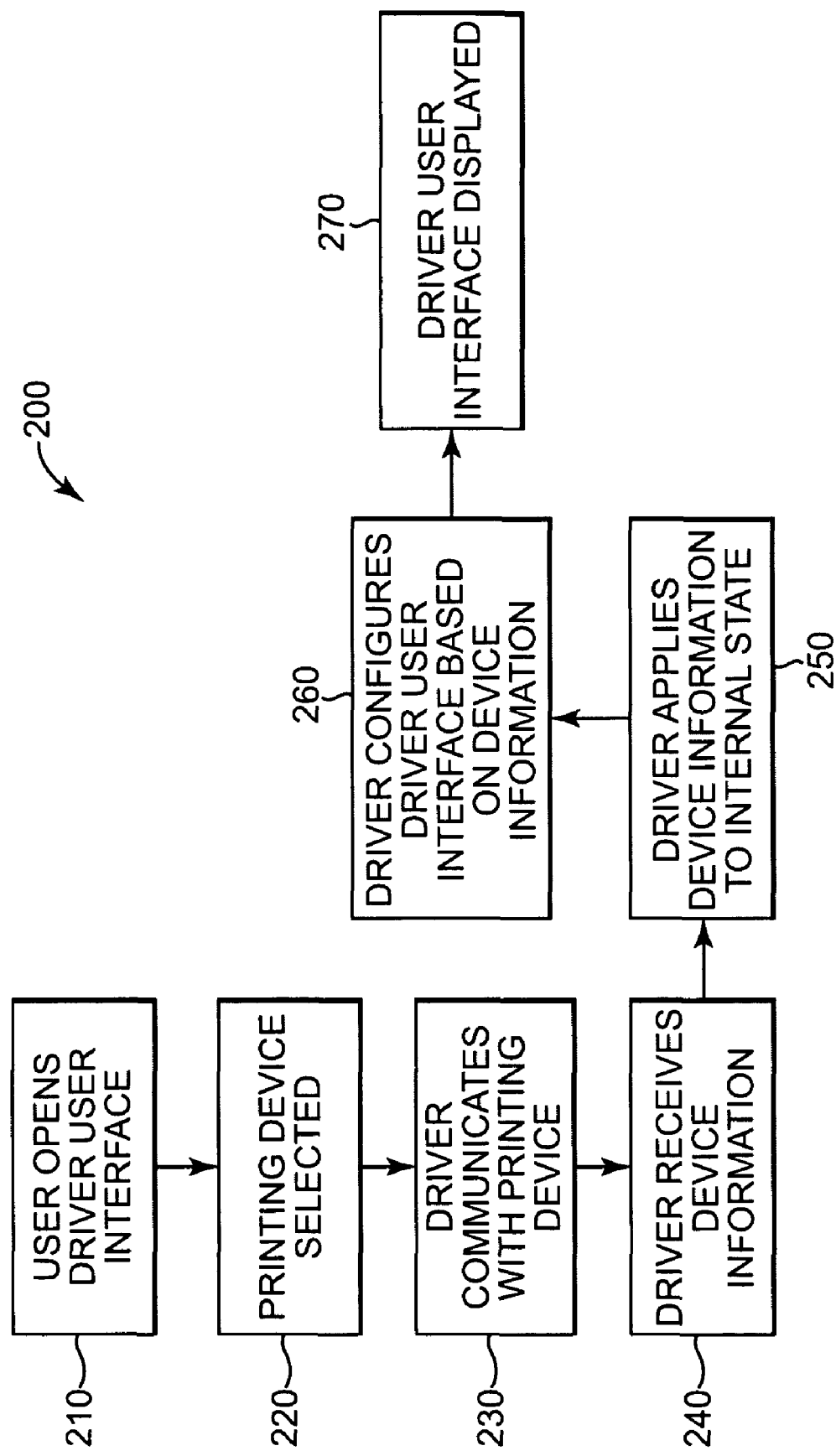
FIG. 4 is a flow diagram illustrating one embodiment of displaying a user interface for a dynamic device driver according to the present invention.

FIG. 4 illustrates one embodiment of a method 200 of configuring and displaying driver user interface 26 for dynamic device driver 20. Reference is also made to FIGS. 1-3. At 210, user 50 opens driver user interface 26 and, at 220, a preferred or desired printing device 30 is selected via driver user interface 26.

At 230, dynamic device driver 20 establishes communication with printing device 30. As such, dynamic device driver 20 binds with printing device 30. In one embodiment, as described above, two-way communication is established between dynamic device driver 20 and printing device 30 via driver communication protocol 22.

In one embodiment, driver communication protocol 22 discovers and connects with printing device 30 when dynamic device driver 20 is initialized or selected for use. More specifically, in one embodiment, driver communication protocol 22 discovers and connects with printing device 30 when driver user interface 26 is opened and, in another embodiment, driver communication protocol 22 discovers and connects with printing device 30 at a time of printing, for example, when a print job is invoked with a printing application.

At 240, dynamic device driver 20 receives device information relevant for utilizing printing device 30. In one embodiment, as described above, driver communication protocol 22 submits query 70 to printing device 30 and receives response 80 from printing device 30. In one embodiment, as described above, response 80 includes capabilities 82 of printing device 30, invocation commands 84 for printing device 30, display strings 86 for printing device 30, and/or state 88 of printing device 30.

At 250, dynamic device driver 20 applies the device information for printing device 30 internally. In one embodiment, for example, as described above, driver communication protocol 22 of dynamic device driver 20 communicates capabilities 82 of printing device 30, display strings 86 for printing device 30, and state 88 of printing device 30 with driver user interface 26, and communicates invocation commands 84 for printing device 30 with driver command emission protocol 26.

At 260, dynamic device driver 20 configures driver user interface 26 to reflect the device information of printing device 30. In one embodiment, as described above, driver user interface 26 is dynamically formatted or generated specifically for printing device 30. More specifically, based on display strings 86, driver user interface 26 is guided to enable and/or disable user-accessible features, options, and/or characteristics of printing device 30. Accordingly, driver user interface 26 is configured to display only those capabilities supported by, provided by, and/or available at printing device 30.

In one embodiment, display strings 86 include a string value and a resource identifier for locating a respective string in a client-resident library. For example, most printing devices support the concept of media type weights (i.e., how thick a sheet of media is). While the specific breakpoints for what constitutes, for example, Heavy media or Cardstock media may differ based on the capability of the hardware, the commands to invoke these different media types, however, may be the same (e.g., MediaType=HEAVY or MediaType=CARDSTOCK). Thus, if display strings 86 for printing device 30 provide the resource identifiers to the strings that should be displayed for user 50, device-specific limits can be presented to user 50 without having to change the underlying commands to invoke the associated functionality. Additionally, display strings 86 provide a way for computing device 40 to localize the content of driver user interface 26 without printing device 30 having to provide localized content in the capabilities description.

At 270, driver user interface 26, as dynamically formatted or generated for printing device 30, is displayed for user 50. In one embodiment, as described above, driver user interface 26 is displayed on user interface 60 of computing device 40 for user 50.

Figure 5:
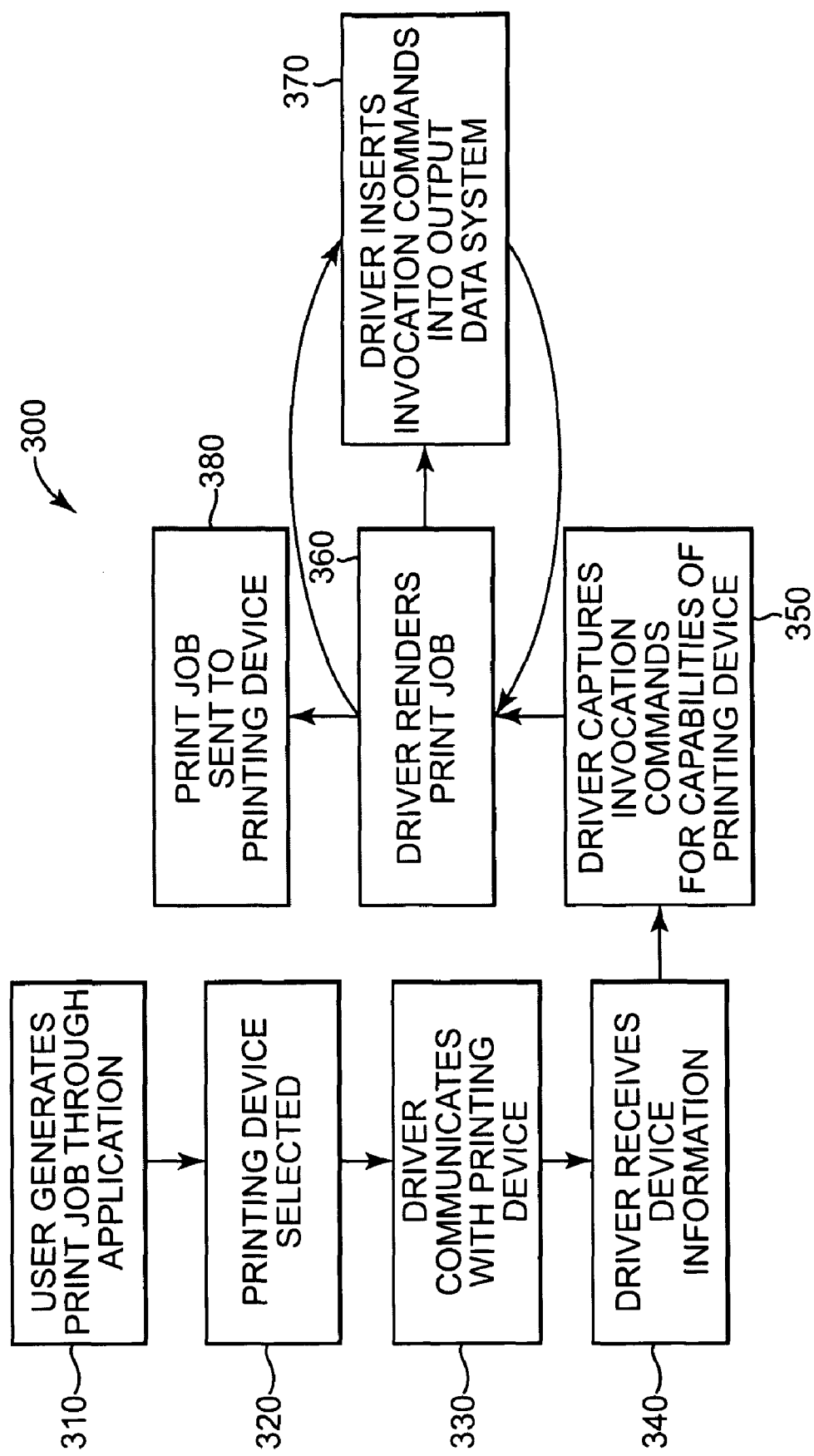
FIG. 5 is a flow diagram illustrating one embodiment of submitting a print job to a printing device according to the present invention.

FIG. 5 illustrates one embodiment of a method 300 of submitting print job 90 to printing device 30 via dynamic device driver 20. Reference is also made to FIGS. 1-3. At 310, user 50 generates print job 90 through application 100 and, at 320, a preferred or desired printing device 30 for generating a printed output of print job 90 is selected.

At 330, dynamic device driver 20 establishes communication with printing device 30. As such, dynamic device driver 20 binds with printing device 30. In one embodiment, as described above, two-way communication is established between dynamic device driver 20 and printing device 30 via driver communication protocol 22.

In one embodiment, driver communication protocol 22 discovers and connects with printing device 30 when dynamic device driver 20 is initialized or selected for use. Dynamic device driver 20 may be initialized or selected for use, for example, at a time of printing or when a print job or printing is initiated.

At 340, dynamic device driver 20 receives device information relevant in utilizing printing device 30. In one embodiment, as described above, driver communication protocol 22 of dynamic device driver 20 submits query 70 to printing device 30 and receives response 80 from printing device 30. In one embodiment, as described above, response 80 includes capabilities 82 of printing device 30, invocation commands 84 for printing device 30, display strings 86 for printing device 30, and/or state 88 of printing device 30.

At 350, dynamic device driver 20 captures invocation commands 84 for invoking capabilities of printing device 30. In one embodiment, as described above, driver communication protocol 22 of dynamic device driver 20 receives and communicates invocation commands 84 for printing device 30 with driver command emission protocol 24 of dynamic device driver 20. In one embodiment, as described above, invocation commands 84 include commands for invoking supported and/or provided features, options, and/or characteristics of printing device 30.

At 360, dynamic device driver 20 renders print job 90 for printing by printing device 30. More specifically, dynamic device driver 20 generates print instructions to be processed or executed by printing device 30 in printing of print job 90.

In one embodiment, as illustrated at 370, and as described above, while rendering print job 90 at 360, dynamic device driver 20 and, more specifically, driver command emission protocol 24 inserts or swaps invocation commands 84 for invoking selected and/or specified capabilities of printing device 30 into an output data stream for print job 90.

In one embodiment, as described above, capabilities 82, invocation commands 84, and/or display strings 86 are provided independent of a supported printer or page description language (PDL). Thus, in one embodiment, dynamic device driver 20 can process invocation commands 84 and emit several different PDLs. Accordingly, dynamic device driver 20 can support multiple types of printing devices.

In one embodiment, an order of and/or where invocation commands 84 are to be inserted into an output data stream for a print job are specified by invocation commands 84 themselves. In one embodiment, for example, invocation commands 84 include an order dependency which identifies a location in the output data stream where a respective command should be inserted and a sequence which identifies a relative ordering of the command within that location. In addition, in one embodiment, invocation commands 84 include job level designations which apply to the entire print job (e.g., resolution, duplexing, and finishing options) and page level designations which are switchable at page boundaries (e.g., orientation, media size, media source, media type).

At 380, dynamic device driver 20 sends print job 90, including invocation commands 84, to printing device 30. As such, printing device 30 prints print job 90 based on print job 90 and invocation commands 84.

Figure 6:
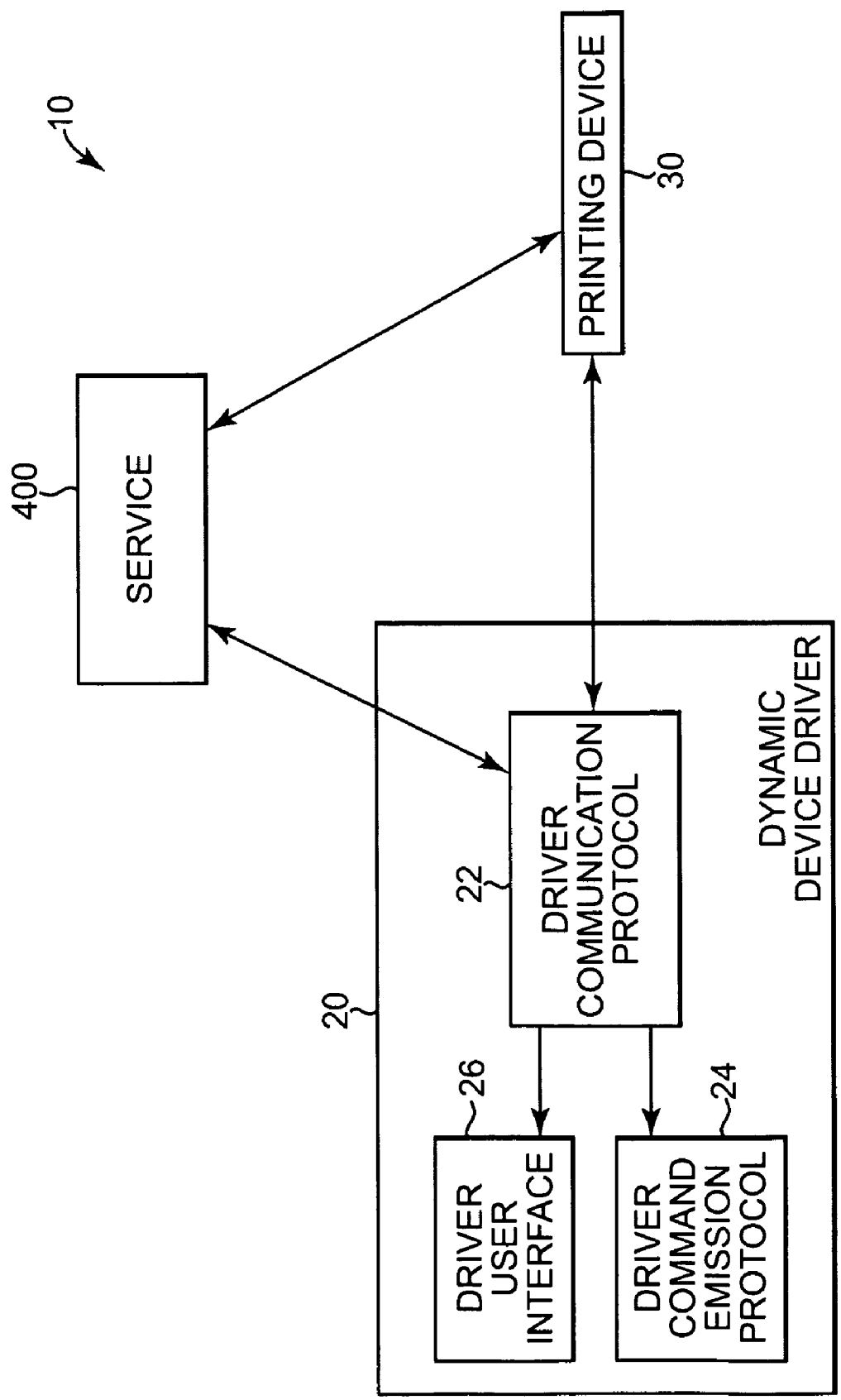
FIG. 6 is a block diagram illustrating another embodiment of obtaining device information in a printing device driver system according to the present invention.

In one embodiment, as illustrated in FIG. 6, printing device driver system 10 includes a service 400. In one embodiment, service 400 is associated with printing device 30 and includes and/or provides access to device information of printing device 30. As such, dynamic device driver 20 communicates with service 400 to obtain device information for utilizing printing device 30 when, for example, as described above, dynamic device driver 20 is initialized or selected for use. Service 400 may include, for example, another device, an application, a server, and/or a website including and/or providing access to device information of printing device 30.

In one embodiment, driver communication protocol 22 of dynamic device driver 20 establishes communication with printing device 30 and service 400. As such, in one embodiment, driver communication protocol 22 queries service 400 for device information of printing device 30. In one embodiment, service 400 includes device information for printing device 30 and, as such, returns the device information to dynamic device driver 20. In another embodiment, service 400 queries printing device 30 for the device information such that printing device 30 returns the device information directly to dynamic device driver 20 or returns the device information to service 400 which, in turn, returns the device information to dynamic device driver 20. As such, dynamic device driver 20 may obtain all or less than all device information for printing device 30 directly from printing device 30, and/or may obtain all or less than all device information for printing device 30 from service 400.

Accordingly, with printing device driver system 10, a single print device driver, such as dynamic device driver 20, can be used to support multiple printing devices, and expose the true and currently available features of the printing devices to end users. More specifically, dynamic device driver 20 has the ability to dynamically enable and/or disable user-accessible features, options, and/or characteristics according to the specific printing device being used. In addition, as the features, options, and/or characteristics of a printing device as well as the instructions or commands for invoking the features, options, and/or characteristics of the printing device are provided by the printing device itself (or a service associated with the printing device), dynamic device driver 20 need not be aware of such device-specific functionality or commands. Thus, dynamic device driver 20 is able to use both generic and device-specific information from a printing device to provide the end user with access to the appropriate functionality of the printing device.

Furthermore, with printing device driver system 10, a printing device driver can be built in real-time. For example, by communicating with printing device 30 (or service 100 associated with printing device 30) and retrieving device information for printing device 30 at a time of printing or when printing is initiated, dynamic device driver 20 can be built at a time of use. Thus, printing device driver system 10 provides for configuration of dynamic device driver 20 during events in a printing device lifetime other than a time of install.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A driver for a printing device, comprising:
   a communication protocol configured to retrieve capabilities of the printing device, invocation commands for invoking the capabilities of the printing device, and display strings for guiding display of the capabilities of the printing device for the printing device when the driver is initialized for use;
   a user interface configured to display the capabilities of the printing device for a user based on the display strings for the capabilities of the printing device as retrieved by the communication protocol; and
   a command emission protocol configured to render a print job of the user for the printing device based on the invocation commands for the capabilities of the printing device as retrieved by the communication protocol,
   wherein the invocation commands include an order dependency which identifies a location of where a respective invocation command should be inserted into an output data stream for the print job, and a sequence which identifies a relative ordering of the respective invocation command within the location.

2. The driver of claim 1, wherein the communication protocol is configured to retrieve the capabilities of the printing device, the invocation commands for the capabilities, and the display strings for the capabilities when the user interface is opened.

3. The driver of claim 1, wherein the communication protocol is configured to retrieve the capabilities of the printing device, the invocation commands for the capabilities, and the display strings for the capabilities when the print job is invoked.

4. The driver of claim 1, wherein the communication protocol is configured to retrieve the capabilities of the printing device, the invocation commands for the capabilities, and the display strings for the capabilities at a time other than install of the driver.

5. The driver of claim 1, wherein the communication protocol is configured to communicate directly with the printing device and retrieve the capabilities of the printing device, the invocation commands for the capabilities, and the display strings for the capabilities directly from the printing device.

6. The driver of claim 5, wherein the communication protocol is configured to query the printing device and receive the capabilities of the printing device, the invocation commands for the capabilities, and the display strings for the capabilities in response to the query.

7. The driver of claim 1, wherein the communication protocol is configured to communicate with a service associated with the printing device and retrieve the capabilities of the printing device, the invocation commands for the capabilities, and the display strings for the capabilities from the service.

8. The driver of claim 1, wherein the capabilities of the printing device are identified from a model of the printing device.

9. The driver of claim 1, wherein the capabilities of the printing device include at least one of media capabilities including at least one of media sizes, types, and orientation, media handling capabilities including at least one of duplexing, stapling, folding, collating, and functionality capabilities including at least one of quality, color, and speed.

10. The driver of claim 1, wherein the display strings include a string value and a resource identifier for locating a respective display string.

11. The driver of claim 1, wherein based on the display strings for the capabilities of the printing device as retrieved by the communication protocol, the user interface is dynamically formatted to display only the capabilities provided by the printing device.

12. The driver of claim 11, wherein the communication protocol is further configured to retrieve a state of the printing device, and wherein the user interface is dynamically formatted to display the state of the printing device.

13. The driver of claim 1, wherein the print job specifies selected ones of the capabilities of the printing device for printing of the print job, and wherein the invocation commands for the selected ones of the capabilities of the printing device are inserted into an output data stream for the print job as the print job is rendered by the driver.

14. The driver of claim 1, wherein the capabilities of the printing device, the invocation commands for the capabilities, and the display strings for the capabilities are printer language independent.

15. A method of implementing a driver for a printing device, the method comprising:
upon selecting the driver for use, retrieving capabilities of the printing device, invocation commands for invoking the capabilities of the printing device, and display strings for guiding display of the capabilities of the printing device for the printing device;
displaying the capabilities of the printing device for a user based on the display strings for the capabilities of the printing device as retrieved for the printing device; and
rendering a print job of the user for the printing device based on the invocation commands for the capabilities of the printing device as retrieved for the printing device,
the invocation commands including an order dependency identifying a location of where a respective invocation command should be inserted into an output data stream for the print job, and a sequence identifying a relative ordering of the respective invocation command within the location.

16. The method of claim 15, further comprising:
before rendering the print job, initiating the print job for the printing device,
wherein retrieving the capabilities of the printing device, the invocation commands for the capabilities, and the display strings for the capabilities includes retrieving the capabilities of the printing device, the invocation commands for the capabilities, and the display strings for the capabilities when the print job is initiated.

17. The method of claim 15, wherein retrieving the capabilities of the printing device, the invocation commands for the capabilities, and the display strings for the capabilities includes communicating directly with the printing device and retrieving the capabilities of the printing device, the invocation commands for the capabilities, and the display strings for the capabilities directly from the printing device.

18. The method of claim 17, wherein retrieving the capabilities of the printing device, the invocation commands for the capabilities, and the display strings for the capabilities includes querying the printing device and receiving the capabilities of the printing device, the invocation commands for the capabilities, and the display strings for the capabilities in response thereto.

19. The method of claim 15, wherein retrieving the capabilities of the printing device, the invocation commands for the capabilities, and the display strings for the capabilities includes communicating with a service associated with the printing device and retrieving the capabilities of the printing device, the invocation commands for the capabilities, and the display strings for the capabilities from the service.

20. The method of claim 15, wherein the capabilities of the printing device are identified from a model of the printing device.

21. The method of claim 15, wherein the capabilities of the printing device include at least one of media capabilities including at least one of media sizes, types, and orientation, media handling capabilities including at least one of duplexing, stapling, folding, collating, and functionality capabilities including at least one of quality, color, and speed.

22. The method of claim 15, wherein displaying the capabilities of the printing device includes displaying the capabilities on a user interface for the driver and, based on the display strings for the capabilities of the printing device, dynamically formatting the user interface and displaying only the capabilities provided by the printing device.

23. The method of claim 22, further comprising:
retrieving a state of the printing device,
wherein displaying the capabilities of the printing device further includes dynamically formatting the user interface and displaying the state of the printing device.

24. The method of claim 15, further comprising:
the user submitting the print job for printing by the printing device, including the user specifying selected ones of the capabilities of the printing device for printing of the print job,
wherein rendering the print job for the printing device includes the driver inserting the invocation commands for the selected ones of the capabilities of the printing device into an output data stream for the print job.

25. The method of claim 15, wherein the capabilities of the printing device, the invocation commands for the capabilities, and the display strings for the capabilities are printer language independent.

26. A computer-readable memory storing computer-executable instructions that when executed by a processor of a computing device function as a driver for a printing device, the driver comprising:
- a communication protocol configured to retrieve capabilities of the printing device, invocation commands for invoking the capabilities of the printing device, and display strings for guiding display of the capabilities of the printing device for the printing device when the driver is initialized for use;
- a user interface configured to display the capabilities of the printing device for a user based on the display strings for the capabilities of the printing device as retrieved by the communication protocol; and
- a command emission protocol configured to render a print job of the user for the printing device based on the invocation commands for the capabilities of the printing device as retrieved by the communication protocol,
- wherein the invocation commands include an order dependency which identifies a location of where a respective invocation command should be inserted into an output data stream for the print job, and a sequence which identifies a relative ordering of the respective invocation command within the location.

27. The driver of claim 26, wherein the communication protocol is configured to retrieve the capabilities of the printing device, the invocation commands for the capabilities of the printing device, and the display strings for the capabilities of the printing device when a user interface for the driver is opened.

28. The driver of claim 26, wherein the communication protocol is configured to retrieve the capabilities of the printing device, the invocation commands for the capabilities of the printing device, and the display strings for the capabilities of the printing device when the print job is initiated.

29. The driver of claim 26, wherein the communication protocol is configured to communicate directly with the printing device and retrieve the capabilities of the printing device, the invocation commands for the capabilities of the printing device, and the display strings for the capabilities of the printing device directly from the printing device.

30. The driver of claim 26, wherein the communication protocol is configured to query the printing device and receive in response thereto the capabilities of the printing device, the invocation commands for the capabilities of the printing device, and the display strings for the capabilities of the printing device.

31. The driver of claim 26, wherein the communication protocol is configured to communicate with a service associated with the printing device and retrieve the capabilities of the printing device, the invocation commands for the capabilities of the printing device, and the display strings for the capabilities of the printing device from the service.

32. The driver of claim 26, wherein the user interface is dynamically formatted to display only the capabilities provided by the printing device based on the display strings for the capabilities of the printing device as retrieved by the communication protocol.

33. The driver of claim 26, wherein the print job specifies selected ones of the capabilities of the printing device for printing of the print job, and wherein the invocation commands for the selected ones of the capabilities of the printing device are inserted into an output data stream for the print job as the print job is rendered by the driver.

34. The driver of claim 26, wherein the capabilities of the printing device, the invocation commands for the capabilities, and the display strings for the capabilities are printer language independent.

* * * * *